(12) United States Patent
Borse et al.

(10) Patent No.: US 7,879,383 B2
(45) Date of Patent: Feb. 1, 2011

(54) ROSEMARY HERBAL BEVERAGE POWDER AND PROCESS

(75) Inventors: Babasaheb Bhaskarrao Borse, Mysore (IN); Kulathooran Ramlakshmi, Mysore (IN); Guruguntla Sulochanamma, Mysore (IN); Bashyam Raghavan, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 918 days.

(21) Appl. No.: 10/584,176

(22) PCT Filed: Dec. 26, 2003

(86) PCT No.: PCT/IB03/06189

§ 371 (c)(1),
(2), (4) Date: Mar. 28, 2007

(87) PCT Pub. No.: WO2005/070236

PCT Pub. Date: Aug. 4, 2005

(65) Prior Publication Data
US 2007/0275149 A1 Nov. 29, 2007

(51) Int. Cl.
*A23L 2/08* (2006.01)

(52) U.S. Cl. ............. 426/590; 426/330; 426/330.3; 426/541; 426/597; 426/425; 426/431; 426/433; 424/756

(58) Field of Classification Search ............. 426/330, 426/330.3, 541, 590, 597, 425, 431, 433; 424/756
See application file for complete search history.

(56) References Cited

U.S. PATENT DOCUMENTS

| | | | | |
|---|---|---|---|---|
| 3,397,063 A | * | 8/1968 | Carlson et al. | 426/90 |
| 3,715,216 A | * | 2/1973 | Wuhrmann et al. | 426/285 |
| 4,199,610 A | * | 4/1980 | Hughes et al. | 426/590 |
| 4,877,635 A | * | 10/1989 | Todd, Jr. | 426/542 |
| 6,576,285 B1 | * | 6/2003 | Bader et al. | 426/590 |
| 2001/0048965 A1 | | 12/2001 | Cherukuri | |
| 2003/0185916 A1 | | 10/2003 | Haworth et al. | |

FOREIGN PATENT DOCUMENTS

| | | | |
|---|---|---|---|
| EP | 0 772 977 | | 5/1997 |
| JP | 59075978 A | * | 4/1984 |
| RU | 2 055 492 | | 3/1996 |
| WO | 99/20289 | | 4/1999 |

OTHER PUBLICATIONS

Igoe, Robert S. and Yiu H. Hui, Dictionary of Food Ingredients, 2001, Aspen Publishers, Inc. pp. 127.*
English Abstract of RU 2 055 492 dated Mar. 10, 1996.

* cited by examiner

*Primary Examiner*—Jennifer C McNeil
*Assistant Examiner*—Hong Mehta
(74) *Attorney, Agent, or Firm*—Ladas & Parry LLP

(57) ABSTRACT

The present invention relates to a process for the preparation of a readily reconstitutable herbal beverage concentrate in powder form. The process in particular, describes the method of preparation of herbal beverage concentrate from rosemary using a set of unit operations and approved food grade additives. The invention describes a rosemary herbal beverage powder comprising encapsulated rosemary flavor 0.47-3.70%, rosemary extract 4.60-10.50%, sucrose 84.30-94.90%, organic acid 0.07-1.60%, and sodium benzoate 0.01-0.40%

15 Claims, No Drawings

ROSEMARY HERBAL BEVERAGE POWDER AND PROCESS

FIELD OF THE PRESENT INVENTION

This invention relates to a process for preparation of a readily reconstitutable herbal beverage concentrate in powder form. The process in particular, describes the method of preparation of herbal beverage concentrate from rosemary using a set of unit operations and approved food grade additives.

BACKGROUND AND PRIOR ART REFERENCES OF THE PRESENT APPLICATION

Rosemary is a small evergreen shrub growing wild throughout Europe and in many parts of India, where dry to moderately moist climate prevails during most part of the year. Unlike many other herbs, rosemary has a very strong and pleasant cineolic aroma. Leaves of rosemary have an agreeable aromatic odour and camphoraceous taste. The leaves are reported to yield a volatile oil (1-2%) which is used in perfumery, pharmaceutical and culinary purposes especially for flavouring meats, sausages, soups and table sauces. The antioxidant activity of rosemary is well established. Antioxidative principles such as rosemarinic acid, rosamarinol, rosemaridiphenol have been isolated from rosemary. Presently natural antioxidants have assumed a greater significance with respect to several cosmetic and pharmaceutical applications. Reference can be made to a U.S. Pat. No. 4,572,836 (1986) by Bakal A. I., wherein stabilized edible herb composition comprising edible oils, acids, salts and herbs is described. The combination of herbs listed numbering to a double digit will not be a compatible flavour composition when reconstituted. The addition of edible oil in the composition makes it prone to oxidation, adds calories and masks the advantages of health properties of herbs. The quantity of fat required to give a pasty consistency is very high (25-70% by wt.) which is a major drawback of this invention. In the present invention we have not used fat since it is a major health concern these days.

Reference may be made to another U.S. Pat. No. 5,061,405 (1991) by Todd P. H. Jr, wherein stable alkaline solution of labiatae antioxidants by agitating a solvent extract of herb with an aqueous alkaline lower-aliphatic alcoholic or polyol solution and separating the aqueous phase/extract. The drawback of this invention is the use of organic solvents which is not warranted and also it poses the problem of solvent residues in the product. In the present invention we have neither used solvent nor alkali but the process of extraction was carried out at a near neutral pH by using universal solvent water, which keeps the extractives in their native state for realization of maximum bioactivity. There is no fear of solvent residues in this present invention/process. The process further makes the extractives more acceptable for consumption by incorporating other permitted additives. Reference may also be made to a U.S. Pat. No. 4,380,506 (1983) by Kanamori T and Kimura Y, which describes a process for producing preservatives-solvent extracts from herbs. This process comprises preparation of oleoresins from number of herbs using polar and non-polar solvents after recovery of essential oils and then blending the extractives which is different from the present invention and has a major drawback of solvent residues. The present invention/process does not have the problem of solvent residue.

OBJECTS OF PRESENT INVENTION

The main objective of the present invention is to provide a process for preparation of a readily reconstitutable herbal beverage concentrate in powder form.

Yet another objective of present application is to give a refreshing rosemary flavoured beverage Yet another object of the present application is preparation of beverage which can be use in tonic waters and other therapeutic preparations.

SUMMARY OF THE INVENTION

The present invention provides a process for the preparation of a readily reconstitutable herbal beverage concentrate in powder form. The process in particular, describes the method of preparation of herbal beverage concentrate from rosemary using a set of unit operations and approved food grade additives.

DETAILED DESCRIPTION OF THE INVENTION

Accordingly present invention relates to a process for preparation of a readily reconstitutable herbal beverage concentrate in powder form. The process in particular, describes the method of preparation of herbal beverage concentrate from rosemary using a set of unit operations and approved food grade additives.

The invention describes a rosemary herbal beverage powder comprising encapsulated rosemary flavor 0.47-3.70%, rosemary extract 4.60-10.50%, sucrose 84.30-94.90%, Organic acid 0.07-1.60%, Anticaking agent 0.009-0.50%, and Sodium benzoate 0.01-0.40%.

Still another embodiment of the present invention is that the organic acid concentration is in the range of 0.5-1.0%.

Yet another embodiment of present invention provides that the preferred sucrose concentration is in the range of 85-90%.

Still another embodiment of present embodiment provides that the rosemary extract is in the range of 6-8%.

Yet another embodiment of present invention provides that the preferred sodium benzoate concentration is in the range of 0.2-0.4%.

Yet another embodiment of present invention provides that the preferred anticaking agent concentration is in the range of 0.1-0.3%.

Yet another embodiment of present invention provides that the encapsulated rosemary flavour is in the concentration range of 1.5-2.5%.

Still another embodiment of present invention provides the Rosemary herbal beverage powder comprising encapsulated rosemary flavor 0.47-3.70%, rosemary extract 4.60-10.50%, sucrose 84.30-94.90%, Organic acid 0.07-1.60%, Anticaking agent 0.009-0.50%, and Sodium benzoate 0.01-0.40%, said process comprises the steps of:

a. drying the rosemary at 45-65° C. for 4-6 h;
b. pulverizing the dried rosemary to a particle size of 20-30 mesh;
c. extracting essential oil from pulverized rosemary using distilled water in the ratio ranging between 1:1 to 1:4 for 1-3 hr. to obtain aq. extract, containing essential oils;
d. dividing the extract is divided in two parts;
e. emulsifying the first part, encapsulating the aqueous emulsion containing essential oil in conc. Of about 0.5%, a carrier of concentration ranging between 10-20% and an emulsifier of concentration about 0.4% of carrier by drying;

f. filtering the second part of aqueous extract to obtain desired filtrate and residue;

g. concentrating the filtrate;

h. blending the concentrated filtrate with carrier of about 5%;

i. drying the concentrated blended extracts at a temperature of about 60° C. for about 6 h;

j. blending the concentrated extract with encapsulated rosemary flavour of step (e) in the concentration range of 0.47-3.70%, powdered sucrose in the concentration range of 84.30-94.90%, organic acid in the concentration range of 0.07-1.60% and anticaking agent in the concentration range of 0.009-0.50%; and k. obtaining the rosemary herbal beverage powder by collecting the dried material.

Yet another embodiment of present invention provides that the preferred ratio of pulverized rosemary to distilled water is about 1:2.

Still another embodiment of present invention provides that the preferred ratio of distill water for the extraction of residue is 1:1.

Yet another embodiment of present invention provides that the filtrate can be concentrated by evaporation or vacuum distillation.

Still another embodiment of present invention provides that the carrier is selected from a group consisting of *Gum acacia* and maltodextrin.

Yet another embodiment of present invention provides that the organic acid is selected from a group comprising citric acid, malic acid and fumaric acid.

Yet another embodiment of present invention provides that the anticaking agent is selected from a group comprising tricalcium phosphate, silica, and sodium aluminium silicate.

The Process for Preparation of Herbal Beverage Concentrate from Rosemary is Illustrated in the Following Flow Chart

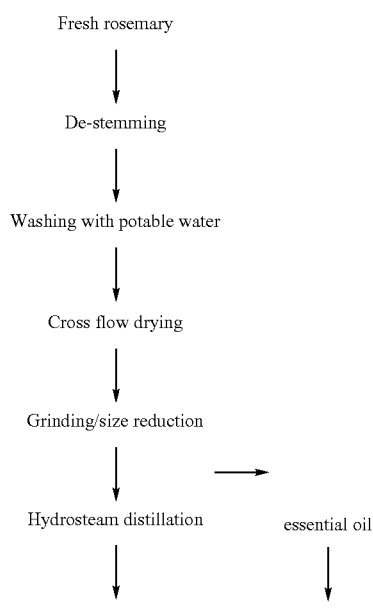
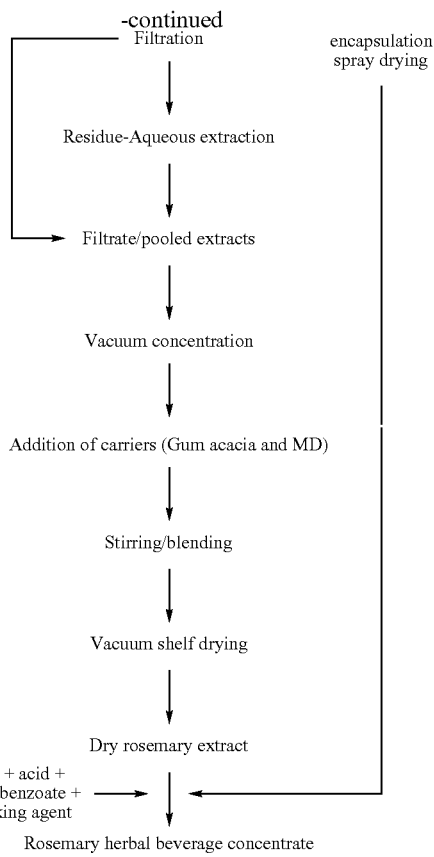

The novelty of the process lies in exploiting the highly antioxidative herb and transforming it into a highly bioactive convenience product using appropriate unit operations.

The following examples are given by way of illustration of the present invention and therefore should not be construed to limit the scope of the present invention.

EXAMPLE 1

The prepared leafy portions of rosemary (10 Kg) were washed, drained and subjected to drying (55° C./4 h) in a cross flow drier which consists of an insulated cabinet fitted with shallow mesh or perforated trays, each of which contains a uniform (2-6 cm deep) layer of herb. Hot air is circulated through the cabinet at 0.5-5 m s-1 per square meter tray area. A system of ducts and baffles is used to direct air over and/or through each tray, to promote uniform air distribution.

An aqueous extract of rosemary was prepared by grinding the dried rosemary (1 kg) to a particle size of 22 mesh BS sieve and boiling with 5.5L water for 2 h using Clevenger trap for recovery of essential oil. The extract was filtered using a cloth filter and the residue boiled again with another 2.5L water (6.5 ° Brix) for 1 h and filtered. The extracts were pooled together and concentrated to a volume of 2.4L. *Gum acacia* and maltodextrin (100 g each) were dissolved separately in equal aliquots of the extracts and blended well in a waring blender. The solution (2.6L; 13.5° Brix) was spread in three aluminium trays in equal quantities and vacuum shelf dried (STOKES, Vacuum Shelf Dryer, PA, USA) at a temperature of 60° C. and under 25 inches vacuum for 6 h. At the end of drying, the vacuum was released, trays withdrawn and the dried material collected (290 g).

Gum acacia, pulvis (200 g) was soaked in 400 ml water for half an hour and volume made up to 2 L with water and filtered. To this solution, rosemary volatile oil (5 ml) was added along with an emulsifier (Tween 60) at a level of 0.4% and homogenized (15000-19000 rpm) for 5 min. The emulsion was spray dried (Bowen, USA) at the feed rate of 60 ml/min at an inlet air temperature of 135° C. and an outlet temperature of 100° C. The yield of encapsulated rosemary flavour was 150 g.

The encapsulated rosemary flavour, 5.0 g, vacuum shelf dried rosemary extract 10 g powdered sucrose, 120 g; citric acid; 1 g, and tricalcium phosphate, 2 g were blended in a Sigma mixer and packed in PP pouches. An aliquot (6 ml) of dry mix thus obtained was added to carbonated water (100 ml) to give a refreshing rosemary flavoured beverage.

EXAMPLE 2

The prepared leafy portions of rosemary (6 Kg) were washed, drained and subjected to drying (55° C./4 h) in a cross flow drier which consists of an insulated cabinet fitted with shallow mesh or perforated trays, each of which contains a uniform (2-6 cm deep) layer of herb. Hot air is circulated through the cabinet at 0.5-5 m s-1 per square meter tray area. A system of ducts and baffles is used to direct air over and/or through each tray, to promote uniform air distribution.

An aqueous extract of rosemary was prepared by grinding the dried rosemary (1 kg) to a particle size of 22 mesh BS sieve and boiling with 2.5L water for 1 h. The extract was filtered using a cloth filter and the residue boiled twice with another 2.5L water (6.8° Brix) for 1 h and filtered. The extracts were pooled together and concentrated to a volume of 2.4L. *Gum acacia* and maltodextrin (100 g each) were dissolved separately in equal aliquots of the extracts and blended well in a waring blender. The solution (2.8L; 12.5° Brix) was spread in three aluminium trays in equal quantities and vacuum shelf dried (STOKES, Vacuum Shelf Dryer, PA, USA) at a temperature of 60° C. and under 25 inches vacuum for 6 h. At the end of drying, the vacuum was released, trays withdrawn and the dried material collected (290 g).

Application of non-volatile extract (vacuum shelf dried powder) in the preparation of dry beverage mix consists of sucrose, citric acid, sodium benzoate, permitted colour (optional) and the anticaking agent. Several experiments were carried out to optimize sweetness-acidity balance, in combination with the intermediate, namely, vacuum shelf dried powder from rosemary as given in annexure.

Annexure

The herbal beverage mix meant for 100 ml of the final beverage consisted of the following:

| | |
|---|---|
| Sucrose | 12 g |
| Citric acid | 0.125 g |
| Vacuum shelf dried rosemary extract | 1 g |
| Sodium benzoate | 0.014 g |
| Tricalcium phosphate | 0.1 g |

These blends were separately dissolved in 100 ml water and evaluated for aroma, taste, aftertaste and overall acceptability. Both were found quite acceptable as a 'still' beverage and as a carbonated beverage. They can find use in tonic waters and other therapeutic preparations.

We claim:

1. Rosemary herbal beverage powder comprising encapsulated rosemary flavor 0.47-3.70% by weight, rosemary extract 4.60-10.50% by weight, sucrose 84.30-94.90% by weight, organic acid 0.07-1.60% by weight, anticaking agent 0.009-0.50% by weight, and sodium benzoate 0.01-0.40% by weight.

2. Rosemary herbal beverage powder as claimed in claim 1, wherein the organic acid concentration is in the range of 0.5-1.0% by weight.

3. Rosemary herbal beverage powder as claimed in claim 1, wherein the sucrose concentration is in the range of 85-90% by weight.

4. Rosemary herbal beverage powder as claimed in claim 2, wherein the rosemary extract is in the range of 6-8% by weight.

5. Rosemary herbal beverage powder as claimed in claim 1, wherein the sodium benzoate concentration is in the range of 0.2-0.4% by weight.

6. Rosemary herbal beverage powder as claimed in claim 1, wherein the anticaking agent concentration is in the range of 0.1-0.3% by weight.

7. Rosemary herbal beverage powder as claimed in claim 1, wherein the encapsulated rosemary flavor is in the concentration range of 1.5-2.5% by weight.

8. A process for the preparation of rosemary herbal beverage powder comprising encapsulated rosemary flavor 0.47-3.70% by weight, rosemary extract 4.60-10.50% by weight, sucrose 84.30-94.90% by weight, organic acid 0.07-1.60% by weight, anticaking agent 0.009-0.50% by weight, and sodium benzoate 0.01-0.04% by weight, said process comprises the steps of:
   a. drying rosemary at 45-65° C. for 4-6 hours;
   b. pulverizing the dried rosemary to a particle size of 20-30 mesh;
   c. extracting essential oil from the pulverizing rosemary using distilled water in a ratio ranging between 1:1 to 1:4 for 1-3 hours to obtain an aqueous extract containing essential oils;
   d. dividing the extract in two parts;
   e. emulsifying a first part of the aqueous extract, encapsulating the aqueous emulsion containing essential oils in concentration of about 0.5%, a carrier of concentration ranging between 10-20% and an emulsifier of concentration about 0.4% of the carrier by drying;
   f. filtering a second part of the aqueous extract to obtain desired filtrate and residue;
   g. concentrating the filtrate;
   h. blending the concentrated filtrate with a carrier, said carrier's concentration ranging about 5%;
   i. drying the concentrated blended extract of step (h) at a temperature of about 60° C. for about 6 hours;
   j. blending the concentrated extract of step (i) with encapsulated material of step (e) in the concentration range of 0.47-3.70% by weight; powdered sucrose in the concentration range of 84.30-94.90% by weight; organic acid in the concentration range of 0.07-1.60% by weight and anticaking agent in the concentration range of 0.009-0.50% by weight; and
   k. obtaining the rosemary herbal beverage by collecting the dried material.

9. Rosemary herbal beverage powder as claimed in claim 1, wherein the rosemary extract is in the range of 6-8% by weight.

10. A process as claimed in claim 8, wherein the ratio of distilled water for the extraction of residue is 1:1.

11. A process as claimed in claim 8, wherein the ratio of the pulverized rosemary to distilled water is about 1:2.

12. A process as claimed in claim 8, wherein the filtrate of step (g) can be concentrated by evaporation or vacuum distillation.

13. A process as claimed in claim 8, wherein the carrier is selected from a group consisting of gum acacia and maltodextrin.

14. A process as claimed in claim 8, wherein the organic acid is selected from a group comprising citric acid, malic acid and fumaric acid.

15. A process as claimed in claim 8, wherein the anticaking agent is selected from a group comprising tricalcium phosphate, silica, and sodium aluminium silicate.

* * * * *